United States Patent
Harvey

(10) Patent No.: US 11,667,225 B2
(45) Date of Patent: Jun. 6, 2023

(54) VEHICLE ATTACHMENT STRAPS WITH INTEGRATED HANDLE AND METHOD THEREOF

(71) Applicant: MasterTop, Inc., Golden, CO (US)

(72) Inventor: Matthew Chenery Harvey, Celeste, TX (US)

(73) Assignee: MasterTop, Inc., Golden, CO (US)

( * ) Notice: Subject to any disclaimer, the term of this patent is extended or adjusted under 35 U.S.C. 154(b) by 0 days.

(21) Appl. No.: 17/389,067

(22) Filed: Jul. 29, 2021

(65) Prior Publication Data

US 2023/0032309 A1    Feb. 2, 2023

(51) Int. Cl.
*B60N 3/02*    (2006.01)
*B60J 7/10*    (2006.01)

(52) U.S. Cl.
CPC ............. *B60N 3/026* (2013.01); *B60J 7/104* (2013.01)

(58) Field of Classification Search
CPC ........... B60N 3/023; B60N 3/026; B60N 3/02
USPC ........................................ 296/1.02
See application file for complete search history.

(56) References Cited

U.S. PATENT DOCUMENTS

| 9,205,724 | B2 * | 12/2015 | Marcus | B60J 3/02 |
| 10,343,575 | B1 * | 7/2019 | Lynn | B60R 11/06 |
| 10,793,064 | B2 * | 10/2020 | Troeger | B60Q 3/59 |
| 11,091,079 | B1 * | 8/2021 | Lynn | B60N 3/023 |
| 2018/0111458 | A1 * | 4/2018 | Cretikos | B60J 7/10 |
| 2020/0406818 | A1 * | 12/2020 | Troeger | B60Q 3/40 |
| 2021/0221203 | A1 * | 7/2021 | Demming | B60J 7/10 |
| 2022/0212586 | A1 * | 7/2022 | Lynn | B60N 3/026 |

FOREIGN PATENT DOCUMENTS

| CN | 107161060 A | * | 9/2017 | ............. B60N 3/02 |
| CN | 110667448 A | * | 1/2020 | ............. B60N 3/026 |

* cited by examiner

*Primary Examiner* — Jason S Morrow

(57) ABSTRACT

Apparatus for covering at least a portion of a vehicle, the apparatus comprising: a flexible top; a first extension member extending from the flexible top, the first extension member adapted for attaching the flexible top to the vehicle; a second extension member extending from the flexible top, the second extension member adapted for attaching the flexible top to the vehicle; and a handle having a first handle end and a second handle end, the first handle end coupled to the flexible top, and the second handle end adapted to be coupled to the vehicle.

15 Claims, 16 Drawing Sheets

VEHICLE ATTACHMENT STRAPS WITH INTEGRATED HANDLE AND METHOD THEREOF

FIELD OF THE INVENTION

The present invention relates to motor vehicles, and more particularly to soft tops for use with motor vehicles. Specifically, an apparatus and method are described for attaching a soft top to a vehicle, grab handles extend from the soft top.

BACKGROUND OF THE INVENTION

Automotive vehicles are provided with a top or roof structure that serves multiple functions. Vehicle tops may be provided to protect the occupants of the vehicle from the elements such as sun, rain, and snow. Such tops may be removable, thus resulting in an opening in the top of the vehicle. Removing the top allows the vehicle occupants to be able to see the sky without obstruction from inside their vehicle. Such an unobstructed view may offer a variety of advantages such as increased airflow into the interior of the vehicle, fresh air into the interior of the vehicle, improved view of the sky, and the ability to enjoy nice weather. When temperatures drop and/or precipitation occurs, the removable components can then be reinstalled in order to close the top. Thus, a top that can be removed and reinstalled is considered to be both desirable and versatile.

While vehicles are typically sold with tops that are made of a rigid material (referred to as an Original Equipment Manufacturer or OEM hard top), another option is to operate a vehicle with a structure that is called a "soft top." A soft top covers the top of a vehicle the way an OEM hard top covers the top of a vehicle, but a soft top provides certain features that are not available in a hardtop. One advantage is that a soft top is easier to remove and store than a hard top. A vehicle owner who is driving their vehicle for the day can stop the vehicle, remove the soft top, and store the soft top in the vehicle. With a hard top, the top cannot be stored in the vehicle due to the top's size. Another advantage is that a soft top can be made of a mesh material that allows some sunlight and breeze to enter the vehicle through the vehicle's top. In this manner, the soft top can provide an enhanced driving experience.

One type of vehicle is called an SUV (sport utility vehicle). According to Wikipedia, an SUV is a car classification that combines elements of a road—going passenger car with features from off-road vehicles. Examples of such features may include ground clearance and four-wheel-drive. Furthermore, there is no one definition of an SUV, and the usage varies by country.

Predecessors to SUVs date back to military models. Some consider the 1984 Jeep Cherokee (X J) to be the first SUV in the modern style. The popularity of SUVs significantly increased beginning in the 1990s.

FIG. 1A provides an example of vehicle 100 that may be a popular SUV sold under the trademark Jeep (Jeep is a registered trademark of Fiat Chrysler Automobiles). Common features found in such vehicles include hardtop (or "hard top") 50 and hardtop (or rear top) 214. As shown in the figure, hardtop 50 sits on the top of the vehicle and is situated towards the front of the vehicle. Hardtop 214 also sits on the vehicle and is situated towards the rear of the vehicle. In FIG. 1, other parts of the vehicle are shown to illustrate the relative location of hardtop 50 and hardtop 214. For example, windshield 208, hood 62 and door 220 are shown.

One feature of the vehicle shown in FIG. 1A is the ability to remove hardtop 50 and/or hardtop 214. Either or both hardtops can be removed depending upon the weather and the desires of the vehicle occupants. Either or both hardtops can remain off the vehicle either while the vehicle is stationary, or while the vehicle is in motion. Each hardtop is supported by structural members included with the vehicle. Fastening mechanisms (e.g. threaded bolt-like members, clips, etc.) secure each hardtop to the vehicle's structural members and hold each hardtop in place.

FIG. 1B illustrates vehicle 100 with a different kind of top, namely top 102. Compared to top 50 or top 214, top 102 is comprised of a non-rigid material, such as cloth. The cloth may be comprised of a tightly woven material, such as polyester, and it may be coated with a waterproof coating in order for the top to be water resistant or water proof. In another alternative, top 102 is comprised of a resin such as plastic in order to increase water resistance. In another alternative, top 102 is a loosely woven mesh, so that sunlight and breeze are able to penetrate top 102 and reach the interior of vehicle 100.

FIG. 1B illustrates that vehicle 102 includes sports bars 106, 108. Sports bars are rigid members that extend between the front and rear of vehicle 100. FIG. 1B is a perspective view of a vehicle in which a limited amount of vehicle 100 is shown in the figure. In this figure, hardtop 50 and hardtop 214 have been removed and replaced with soft top 102. With reference to this figure, "front" refers to item location that is closer to the front of the vehicle. "Rear" refers to item location that is closer to the rear of the vehicle. FIG. 1B thus shows that soft top 102 extends from the front to the rear of the vehicle.

Sports bars may be metallic and/or tubular. Sports bars may be rollbars that protect the occupants of vehicle 100 in the event of a rollover incident.

FIG. 1B also illustrates that top 102 includes straps 104 that secure top 102 to sport bars 106, 108. Straps 104 are tied around sports bars 106, 108 to hold top 102 in place. Excessive length of straps 104 may simply hang downward.

In this manner, vehicle 100 may be driven with soft top 102 in place. This may provide a significant and beneficial "open feel" to a driving experience.

SUMMARY OF THE INVENTION

Apparatus for covering at least a portion of a vehicle, said apparatus comprising: a flexible top; a first extension member extending from said flexible top, said first extension member adapted for attaching said flexible top to said vehicle; a second extension member extending from said flexible top, said second extension member adapted for attaching said flexible top to said vehicle; and a handle having a first handle end and a second handle end, said first handle end coupled to said flexible top, and said second handle end adapted to be coupled to said vehicle.

BRIEF DESCRIPTION OF THE DRAWINGS

FIG. 2A illustrates an exemplary embodiment in which the sports bar has been omitted for clarify. FIG. 2B illustrates the embodiment of FIG. 2A with the sports bar shown in the figure. The figures show the exemplary embodiment from the perspective of below the embodiment (for example, from the interior of vehicle 100 on the driver's side of vehicle 100), looking up.

FIG. 4 is a magnified view of a portion of FIG. 2A.

DETAILED DESCRIPTION

Figure 1A:
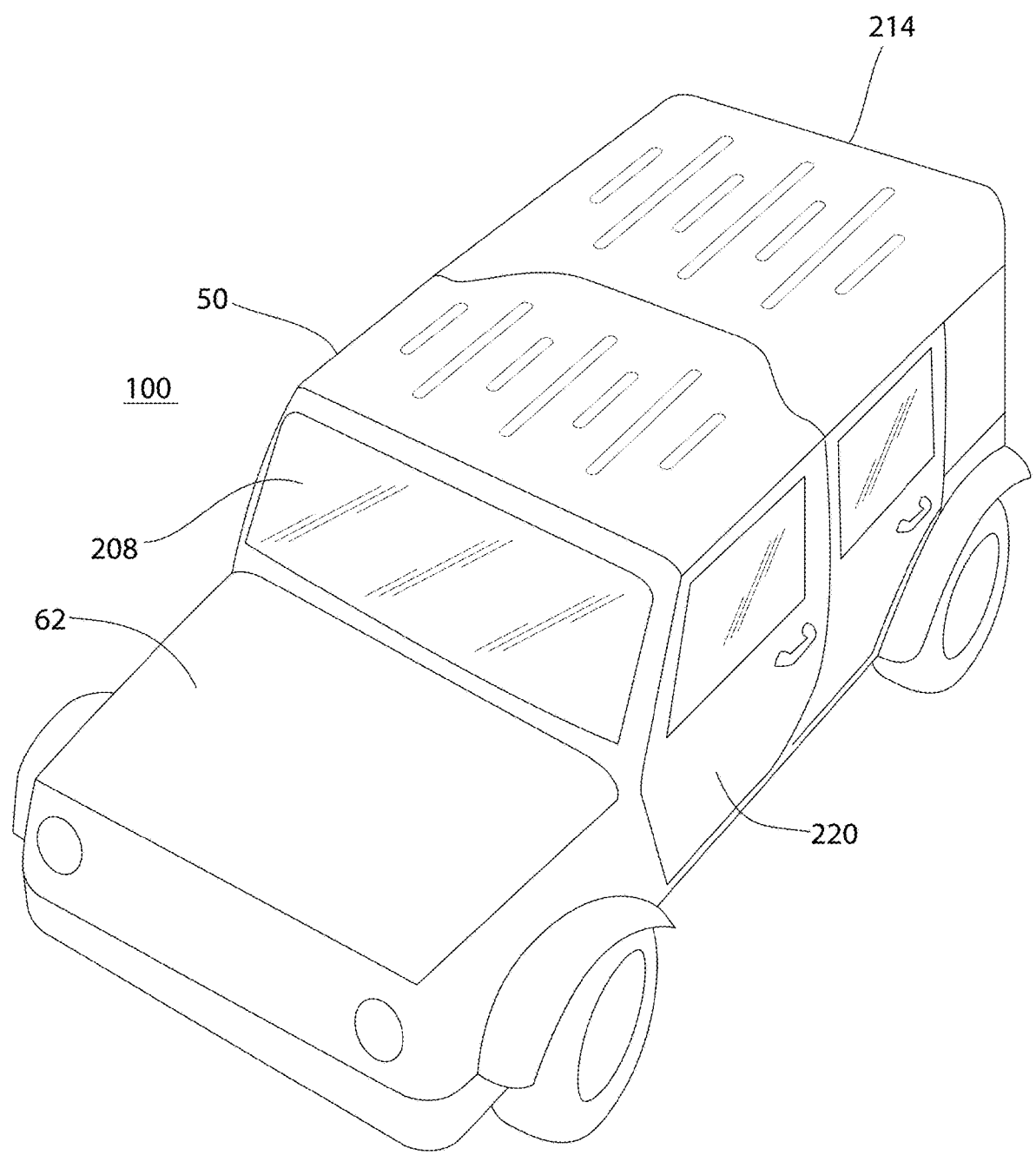
FIG. 1A is a perspective diagram of an exemplary vehicle in accordance with the prior art.
Figure 1B:
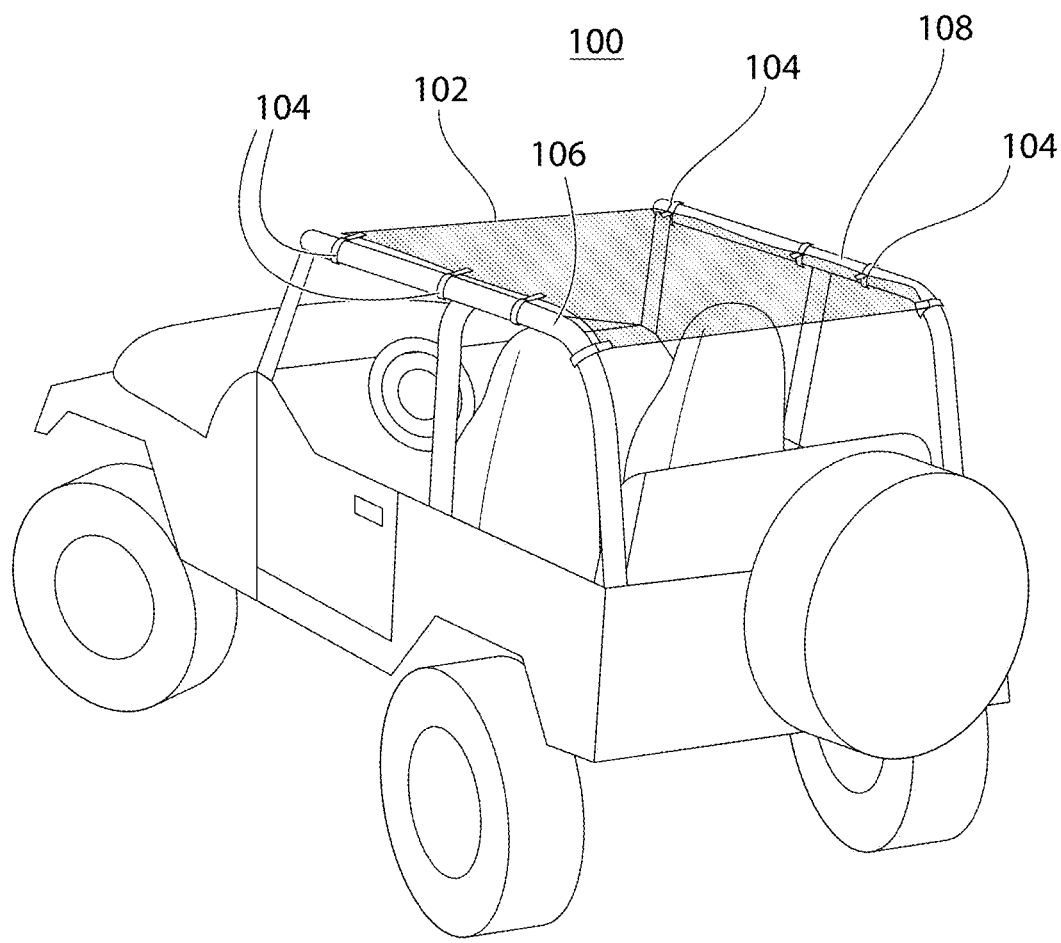
FIG. 1B is a further perspective diagram of an exemplary vehicle in accordance with the prior art.
Figure 2A:
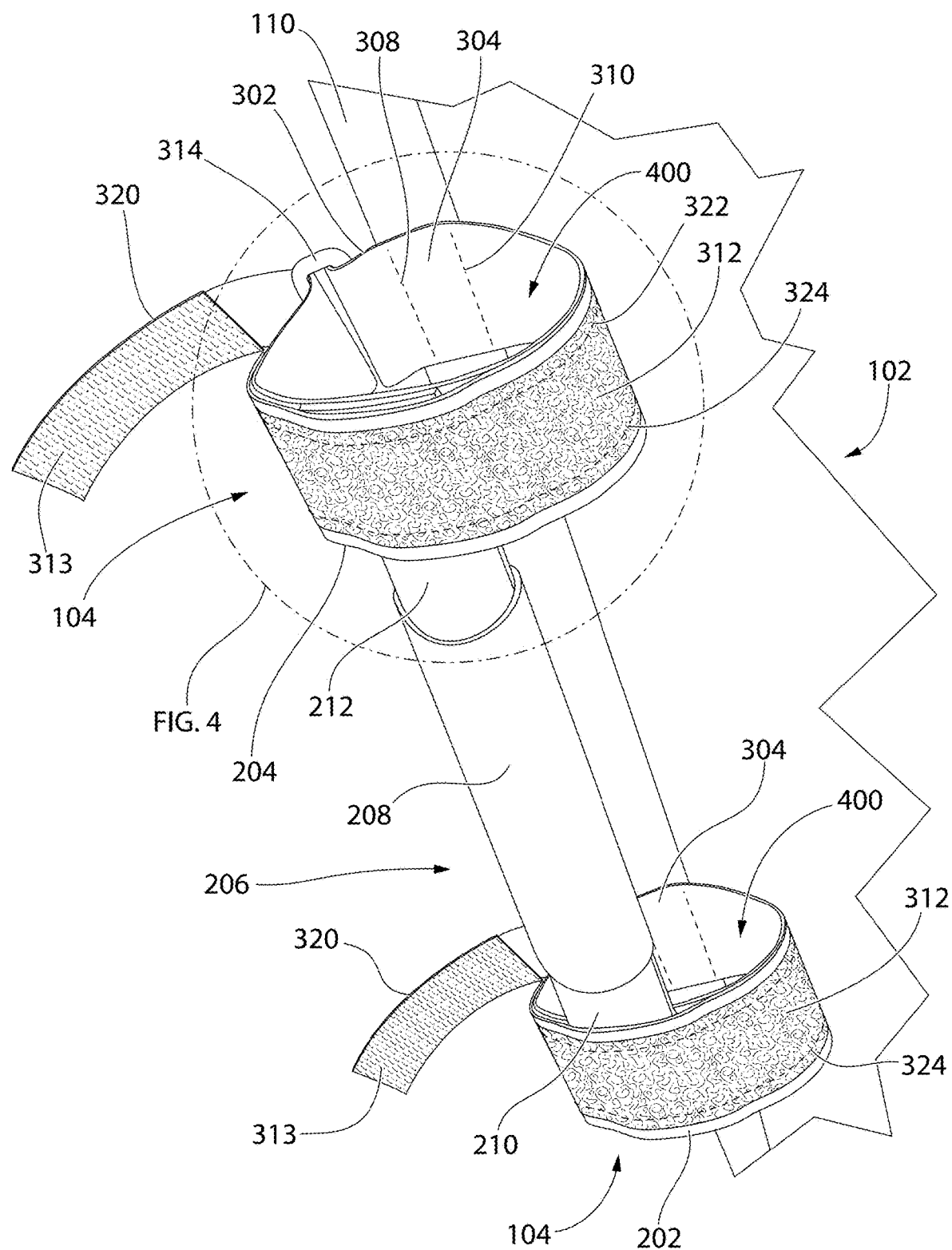
FIG. 2A and FIG. 2B are each perspective diagrams that illustrate an exemplary embodiment of the present invention attached to an exemplary vehicle.

FIG. 2A is a perspective diagram that illustrates top 102 in a configuration suitable for attachment to vehicle 100 in accordance with an exemplary embodiment of the present invention. The perspective diagram shown in FIG. 2A is from the interior left (driver side) of vehicle 100. The perspective is from the position of sitting in the driver's seat of a vehicle and looking up. The vehicle door (with its window) is omitted from the figure. The figure illustrates straps 104 of top 102 in the configuration that would be wrapped around a sports bar. The sports bar is omitted from FIG. 2A for clarity.

Figure 2B:
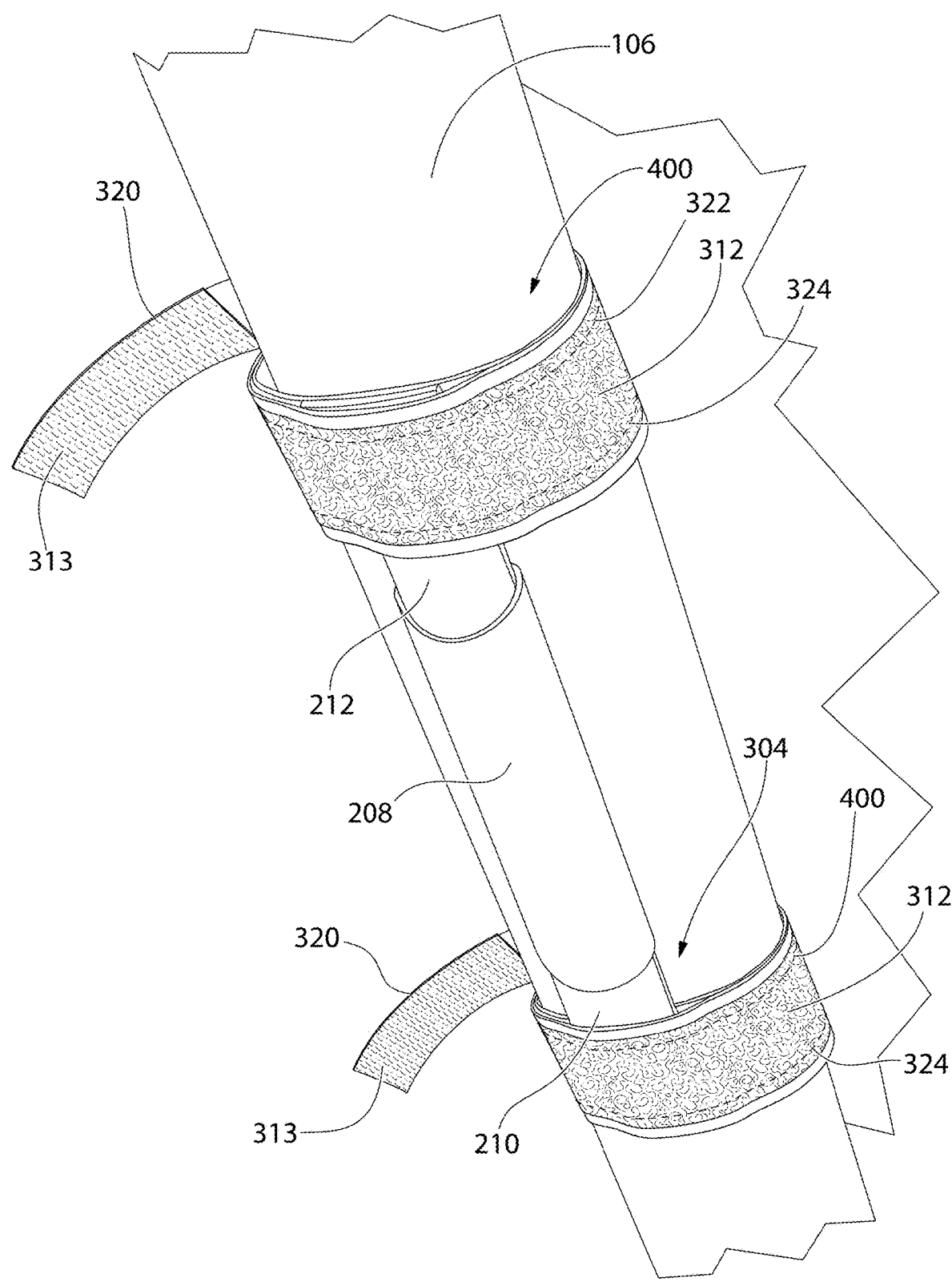

FIG. 2B is the same perspective view shown in FIG. 2A, however in FIG. 2B sports bar 106 is shown, and straps 104 are shown wrapped around sports bar 106.

FIGS. 2A and 2B illustrate that top 102 is secured to sports bar 106 via a plurality of straps (or extension members). FIG. 2A illustrates that first strap (or extension member) 202 and second strap (or extension member) 204 are each in a configuration for attachment to sports bar 106, and first strap 202 and second strap 204 are separated from each other by a distance. In one exemplary embodiment, handle unit 206 spans the distance between first strap 202 and second strap 204.

When "sports bar" is used herein, what is referred to is a structural member located above the passenger compartment of vehicle 100. Thus, a sports bar can take multiple forms including a door rail, a roll bar that protects vehicle occupants in the event of rollover, or some other structural member above the passenger compartment.

Handle unit 206 may be comprised of multiple components, including handle 208, first extension 210 extending between handle 208 and first strap 202, and second extension 212 extending between handle 208 and second strap 204. Handle 208 includes a front that is attached to first extension 210 and a rear that is attached to second extension 212. Handle 208 may be comprised of a plurality of materials, including resin, polyester, etc.

Straps 104 are each illustrated as being oriented in loop 400 so that they may be "looped around" sports bar 106. Looping around a sports bar 106 is one exemplary method of attaching first strap 202, but it is contemplated that one or more straps 104 can be attached to sports bar 106 in other ways as well. As an example, straps 104 can be tethered to sports bar 106 (or another structural component in vehicle 100), straps 104 can be bolted to sports bar 106 (or another structural component in vehicle 100), etc.

Figure 3:
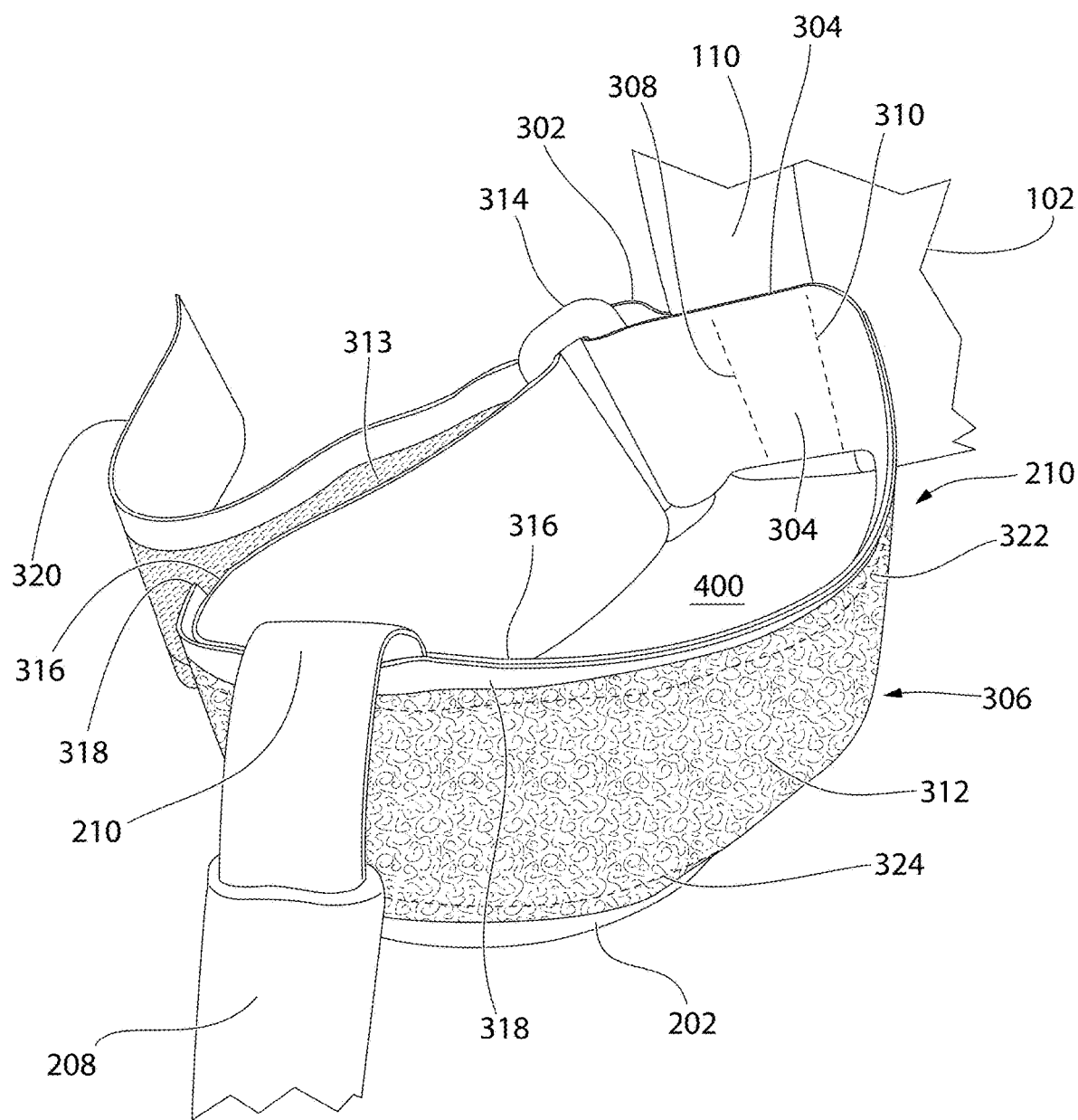
FIG. 3 is a perspective diagram that illustrates a first strap (i.e. a front strap that is closer to the front of the vehicle than a rear strap), in accordance with an exemplary embodiment of the present invention, in the process of being attached to a vehicle. The sports bar has been omitted from the figure for clarity.

FIG. 3 is a perspective drawing of first strap 202 from the perspective of below the strap. The sports bar has been omitted from the figure for clarify. FIG. 3 illustrates the exemplary use of buckle 314 in order for first strap 202 to assume the shape of the loop 400 shown in FIG. 3. Moving from left to right in FIG. 3, first strap 202 includes end section 320, which may be a terminating end of first strap 202. End section 320 extends through buckle 314 and then forms the external side 318 of loop 400 before meeting edge 110 of top 102. The portion of strap 202 to the right of buckle 314 in FIG. 3 is first extension 210. First extension 210 extends into buckle 314 opposite (for example) of where end section 320 extends into buckle 314. First extension 210 wraps around the right portion of buckle 314, and then backtracks in the direction from which it came to form an inner portion 316 of loop 400. Stitch 322 and stitch 324 secures the outer portion 318 of loop 400 to the inner portion 316 of loop 400. Stitch 308 and stitch 310 secure both the outer portion 318 of loop 400 and the inner portion 316 of loop 400 to meeting edge 110 at anchor 304.

Edge 110 appears in FIG. 3. Edge 112 is situated on the opposite side of top 102 and does not appear in FIG. 3. Edges 110, 112 may be formed by folding over the edges of top 102.

Outer portion 318 includes hook and loop surface 312 (an example of hook and loop is Velcro™ manufactured by Velcro Corporation). End section 320 may also include hook and loop surface 313 for attachment to surface 312. Other attachment mechanisms for attaching end section 320 and external side 318 are known, such as fasteners, knots, etc.

FIG. 3 illustrates one exemplary attachment of handle 208 to first strap 202. First extension 210 may be attached to first strap 202 via stitching, or via other attachment mechanisms. As shown in FIG. 3, first extension 210 may be stitched between outer portion 318 and inner portion 316.

Figure 4:
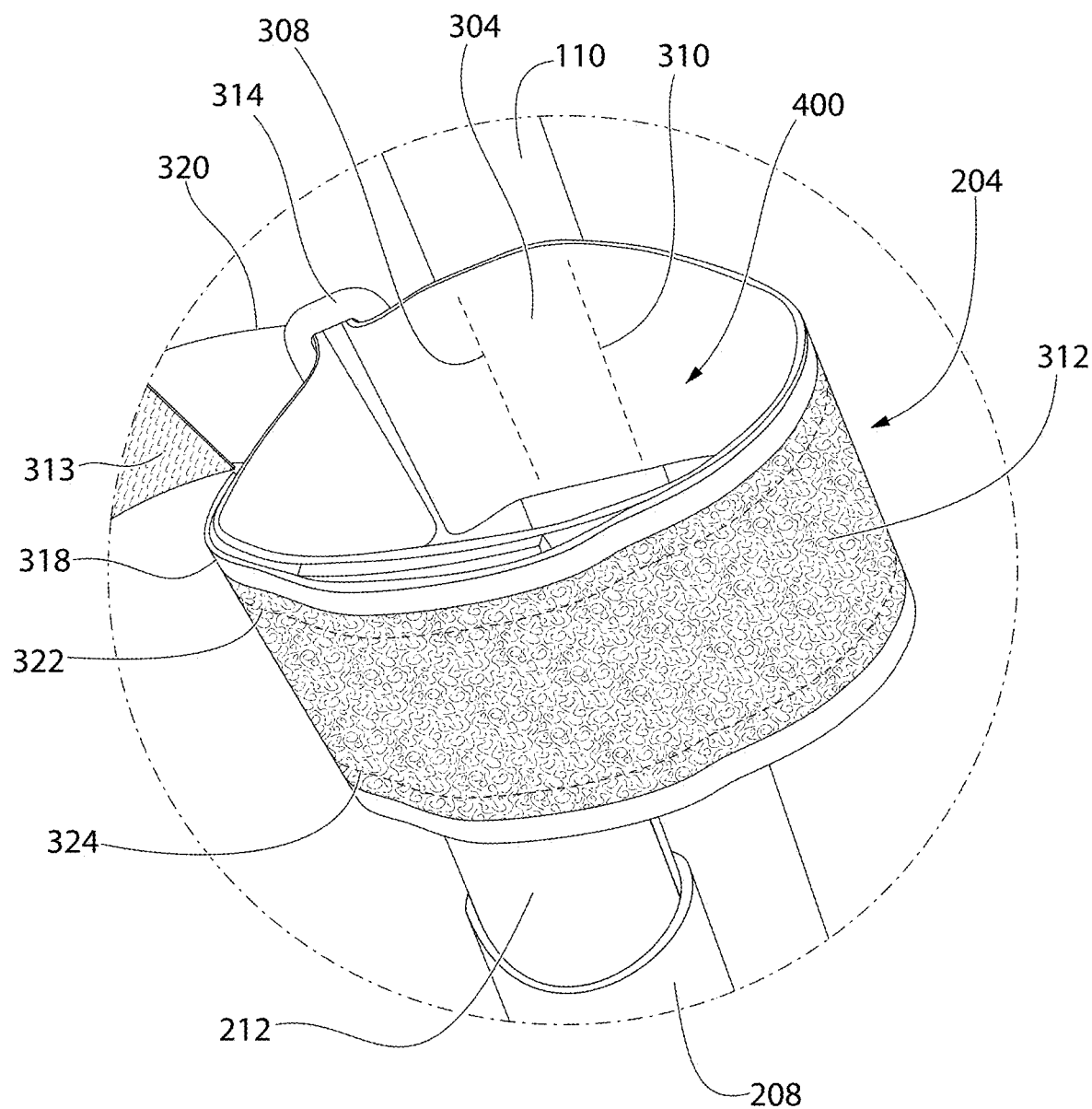
FIG. 4 is a perspective diagram that illustrates a second strap (i.e. a rear strap that is closer to the rear of the vehicle than the front strap), in accordance with an exemplary embodiment of the present invention.

FIG. 4 illustrates second strap 204. FIG. 4 is a close up view of a portion of FIG. 2A. Again, end section 320 extends through belt 314 and then forms loop 400 via inner portion 316, extending through belt 314, reversing in the opposite direction along loop 400, forming outer portion 318, and terminating prior to reaching belt 314 again. Stitch 322 and stitch 324 hold inner portion 316 and outer portion 318 together. Stitching 308, 310 secures second strap 204 to edge 110 at anchor 304. Hook and loop surface 312 is attached to the outside of outer portion 318. Hook and loop surface 313 is also attached to end section 320. End section 320 is attached to outer portion 318 in a variety of ways, such as by adhering surface 313 to surface 312. The use of hook and loop technology is illustrated in the drawing, but other types of attachment (clip, button hole, etc.) may be used. Handle 208 is attached to second strap 204 via second extension 212. Section extension 212 may be situated between outer portion 318 and inner portion 316 and stitched into place.

Figure 5A:
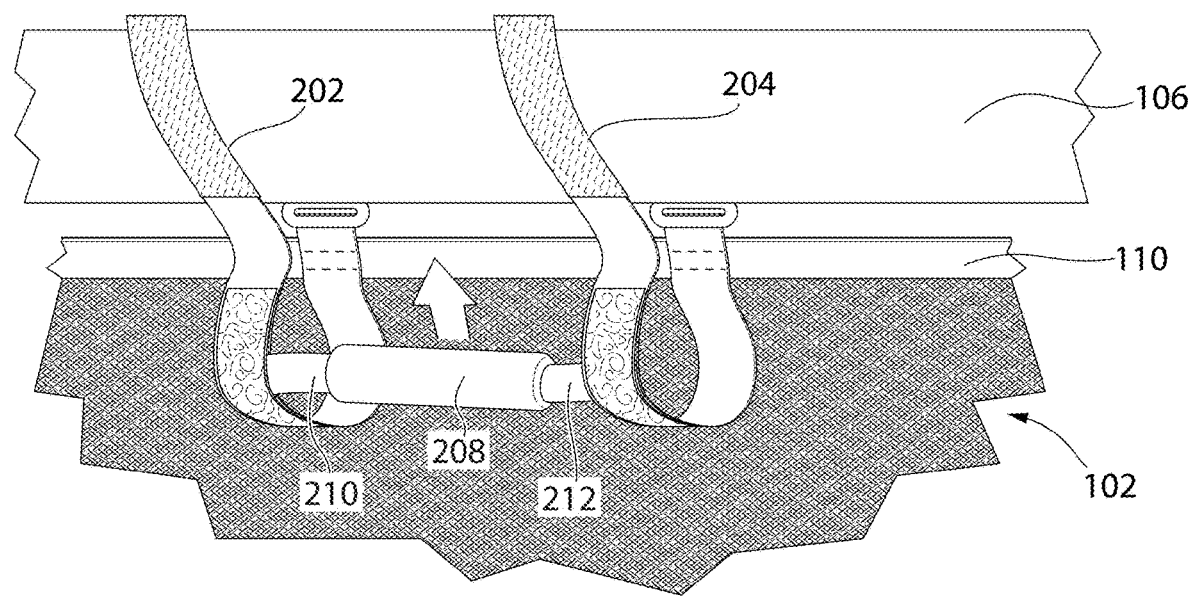
FIGS. 5A, 5B and 5C are diagrams that illustrate sequential steps of attaching a soft top to a vehicle in accordance with an exemplary embodiment of the present invention.
Figure 5B:
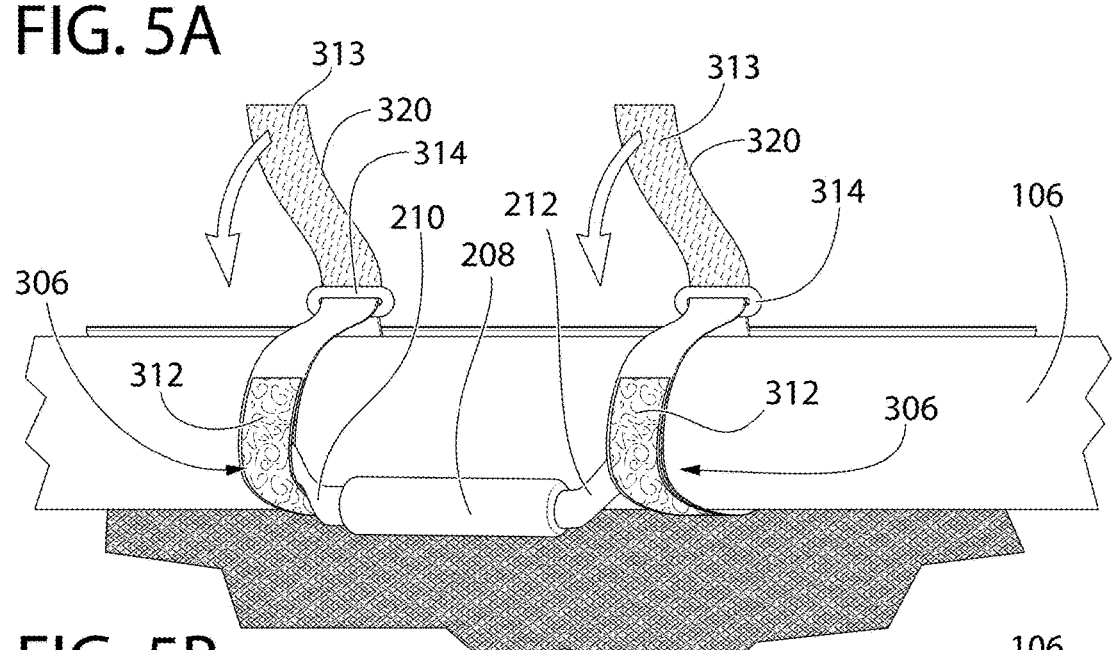
Figure 5C:
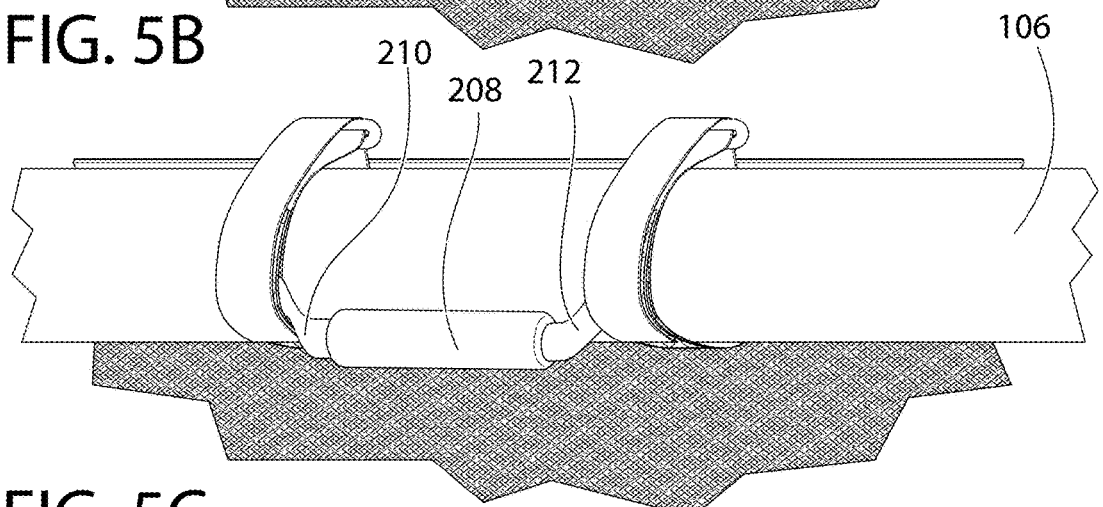

FIGS. 5A, 5B and 5C illustrate sequential steps regarding the attachment of top 102 to vehicle 100. These figures are from the perspective of being directly below sports bar 106 and looking directly up. In each figure, the front of the vehicle is to the left and the rear of the vehicle is to the right. Edge 110 is pulled across sports bar 106 so that buckles 314 extend over the edge of sports bar 106 as shown in FIG. 5B. End sections 320 are extended through buckles 314 as shown in FIG. 5B. End sections 320 with hook and loop surface 313 are then pressed against hook and loop surfaces 312 as shown in FIG. 5C to attach top 102 to sports bar 106. Handle 208 hangs below sports bar 106.

Figure 6:
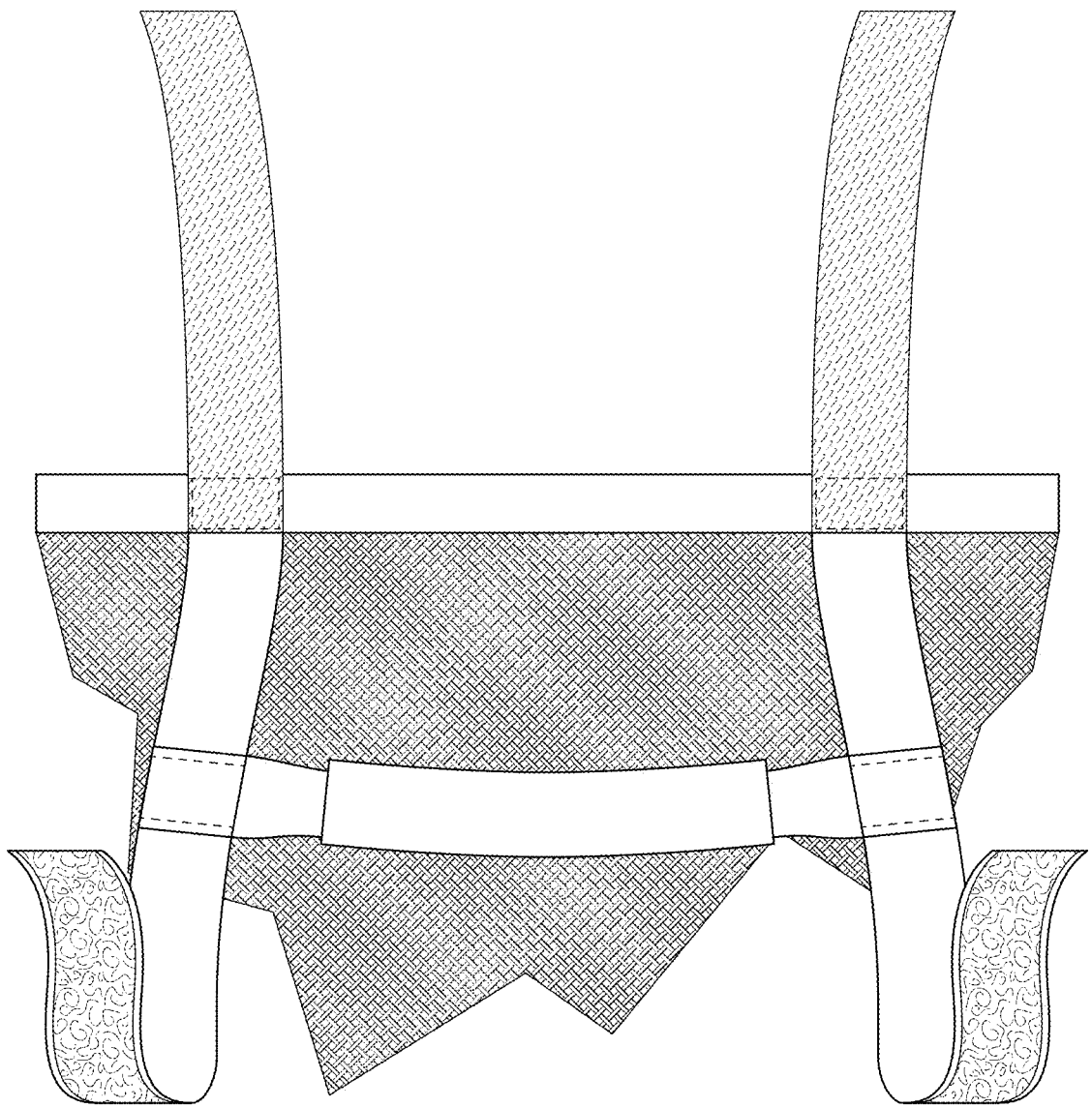
FIG. 6 is a perspective diagram that illustrates a handle between two straps in accordance with a further exemplary embodiment of the present invention.

FIG. 6 illustrates an alternative embodiment of the present invention in which belt 314 has been deleted. First strap 202 and second strap 204 are each attached to edge 110 of top 102 at anchor 304. Each strap 202, 204 includes end section 320. End section 320 includes an attachment mechanism, such as hook and loop surface 313 (although, as in the previous embodiment, other attachment mechanisms are contemplated). First strap 202 and second strap 204 each include strap section 306. Each strap section 306 includes an attachment mechanism, such as hook and loop surfaces 312 (although other attachment mechanisms are contemplated). Handle 208 is attached to strap 202 and 204 via first extension 210 and second extension 212. First extension 210 and second extension 212 are attached to first strap 202 and second strap 204 at anchors 305.

Figure 7A:
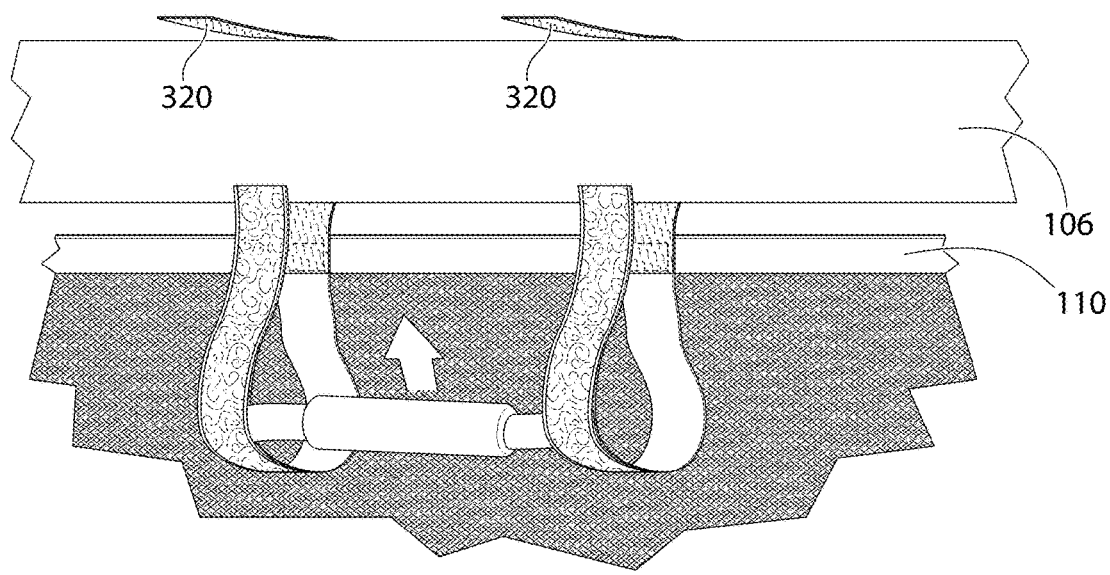
FIGS. 7A, 7B and 7C are diagrams that illustrate sequential steps of attaching a soft top to a vehicle in accordance with a further exemplary embodiment of the present invention.
Figure 7B:
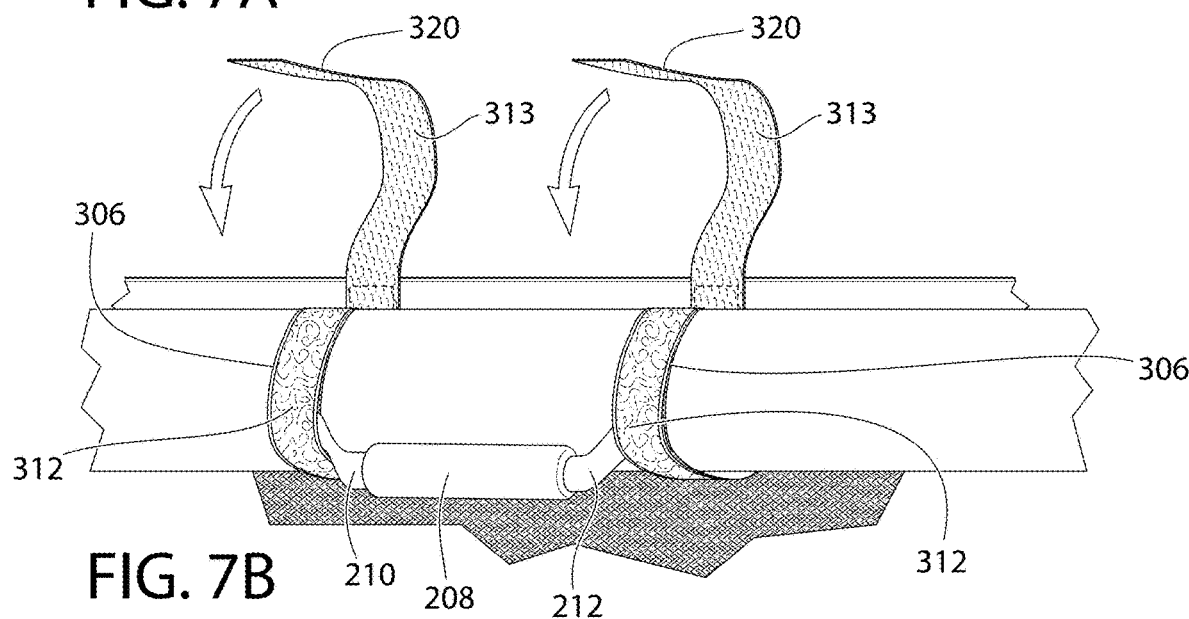
Figure 7C:
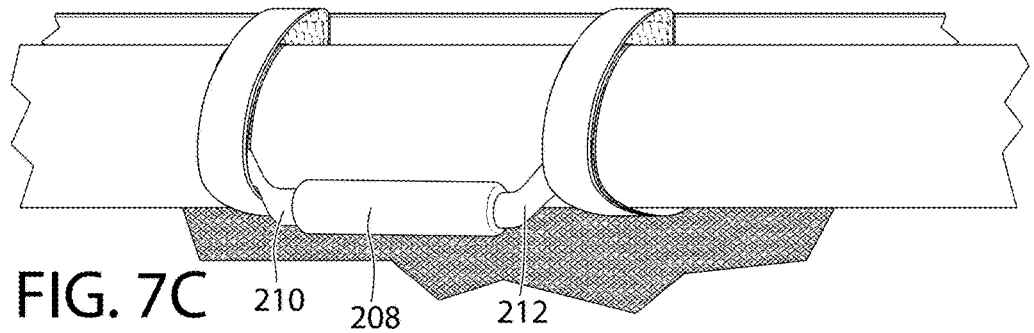

FIGS. 7A, 7B and 7C illustrate top 102 (that is illustrated in FIG. 6) attached to sports bar 106 in several sequential steps. The perspective shown in FIGS. 7A, 7B and 7C is from the driver seat of vehicle 100 looking straight up. In FIG. 7A, end sections 320 are placed over sports bar 106 so they subsequently hang downwards. In FIG. 7B strap sections 306 are wrapped upward around sports bar 106 so that handle 208 hangs downwards. In FIG. 7C, end sections 320 are wrapped downwards so that they make contact with strap sections 306. In this way, hook and loop surfaces 312 and hook and loop surfaces 313 make contact, and top 102 is attached to vehicle 100.

The above explanation has described straps 202, 204 attached to edge 110 wrapped around (or otherwise attached to) sports bar 106. It is understood that top 102 includes other straps (for example, attached to edge 112), and vehicle 100 may include one other sports bar (or other structure on the side of vehicle 100 opposite the side on which sports bar 106 is illustrated). It is understood that top 102 includes straps on multiple sides that are wrapped around (or attached to) structures (e.g. sports bar 108) on multiple sides.

Figure 8:
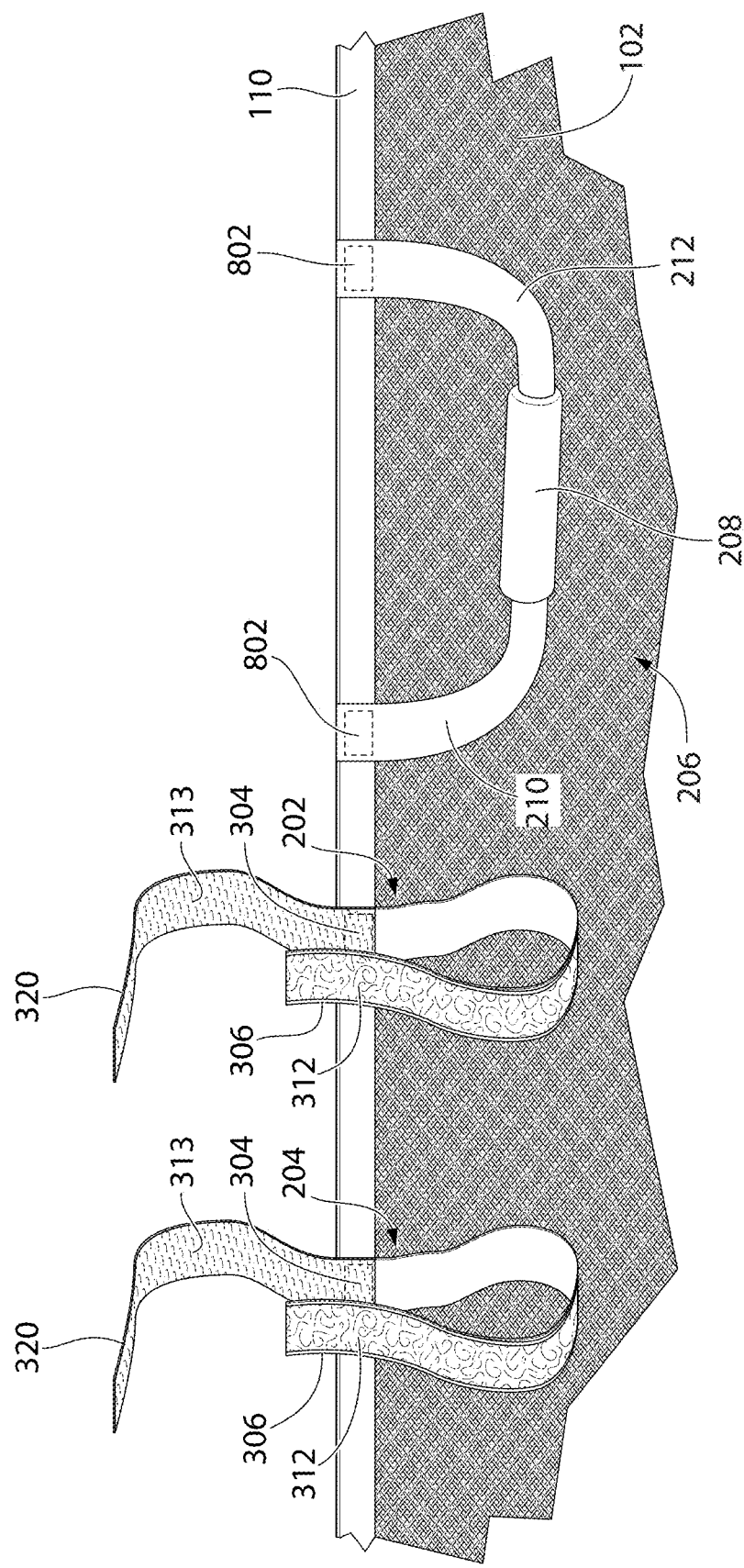
FIG. 8 is a perspective diagram that illustrates a further exemplary embodiment of the present invention.

FIG. 8 is a perspective drawing that illustrates a further exemplary embodiment of the present invention. Again, top 102 appears in the drawing with edge 110. Straps 202, 204 are provided as in other embodiments. Handle 208 includes a front that is attached to first extension 210 and a rear that is attached to second extension 212. However, this embodiment differs from other embodiments because, while the grab handles are integrated with top 102, the grab handles are separated from straps 202, 204. Straps 202, 204 are each attached to edge 110 at anchor 304. End sections 320 are included at one end of straps 202, 204 and strap section 306 is included at the other end of straps 202, 204. Strap section 306 and end section 320 include hook and loop surfaces 312, 313, respectively. The use of hook and loop technology is exemplary. Other mechanisms may be used for attaching first strap 202 and second strap 204 to a vehicle.

While FIG. 8 shows strap 202 and strap 204, the use of two straps as shown are exemplary. For example, strap 202 may be included and strap 204 may be omitted. Strap 202 may be included and another type of mechanism may also be included for attaching top 102 to vehicle 100 (e.g. a sliding mechanism, a track and rail mechanism, a bolt like member that extends through a portion of vehicle 100 and top 102, a hook like member that hooks around a catch, a zipper mechanism, etc. In a further embodiment no straps are used, but other types of attachment mechanisms (e.g. the attachment mechanisms described above, as well as others) may be used. Regardless of how top 102 is attached to vehicle 100, handle unit 206 is coupled to top 102. For example, handle unit 206 may be directly attached top 102 (e.g. first extension 210 is stitched to edge 110). For example, handle unit 206 may be indirectly attached to top 102 (e.g. one of the aforementioned attachment mechanisms is directly attached to top 102, and first extension 210 is directly attached to the attachment mechanism). The above description is merely examples of how top 102 is attached to vehicle 100, and how handle unit 206 is attached to vehicle 100, and the above examples may apply to the embodiment shown in FIG. 8, as a modification to the embodiment shown in FIG. 8, or to or as a modification to another embodiment disclosed herein.

Handle unit 206 is shown separated from straps 202, 204, but handle unit 206 is integrated with top 102. First extension 210 and second extension 212 are each attached to edge 110 at respective anchors 802. Attachment to edge 110 may be accomplished, for example, using stitches (as is disclosed in other embodiments). Other forms of attachment may also be used, such as adhesive, rivets, looping first extension 210 and second extension 212 through openings in edge 110 and then back to itself, respectively, etc.

Figure 9:
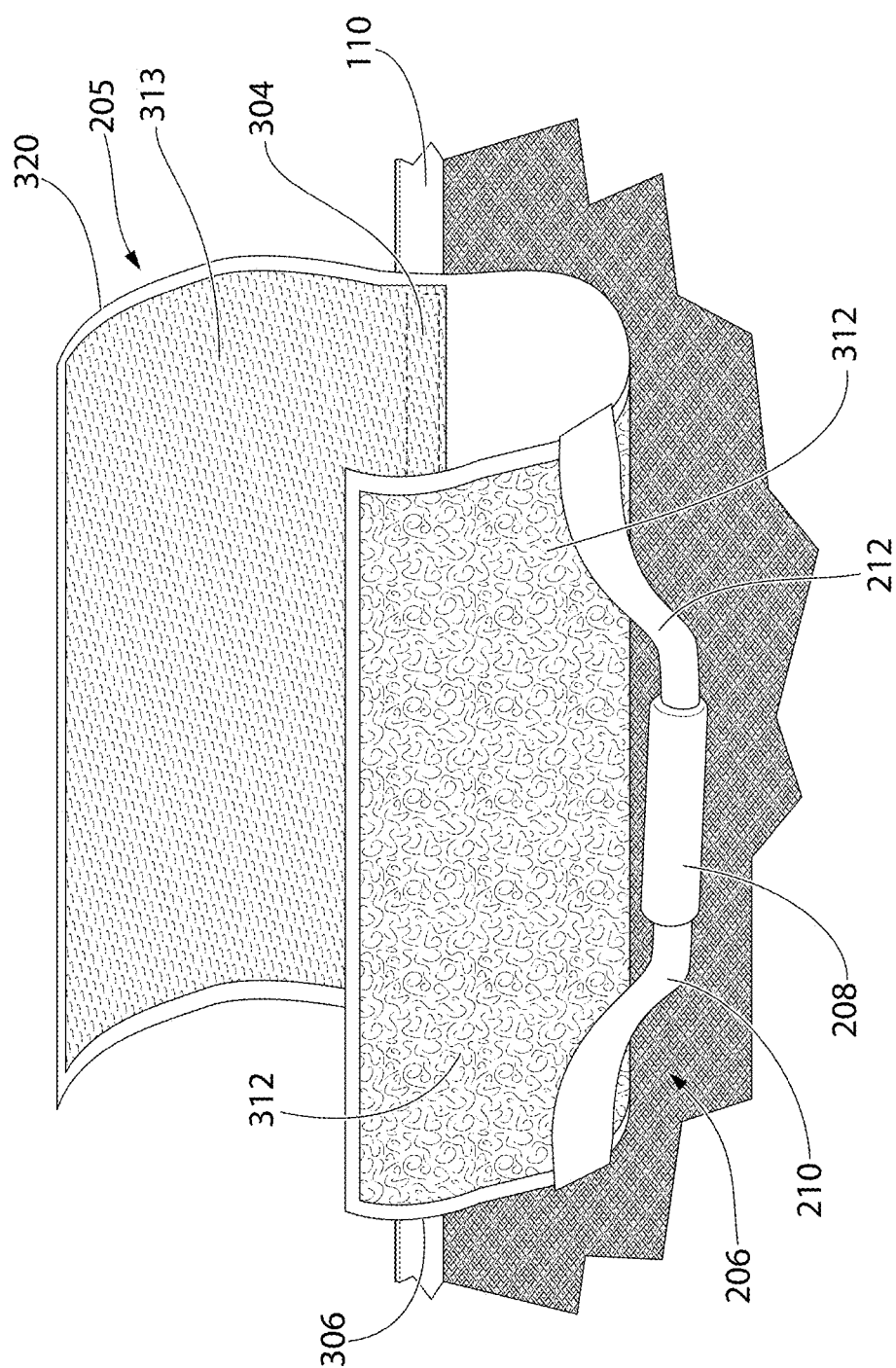
FIG. 9 is a perspective diagram that illustrates a further exemplary embodiment of the present invention.

FIG. 9 is a perspective drawing that illustrates a further exemplary embodiment of the present invention. In FIG. 9, the multiple straps of earlier embodiments have been replaced with a single strap, and handle unit 206 has been integrated with that single strap. The single strap is integrated strap 205 with end section 320 and strap section 306. Hook and loop surfaces 312, 313 enable integrated strap 205 to be wrapped around a portion of vehicle 100, so that integrated strap 205 is attached to vehicle 205. While hook and loop technology is illustrated, other means of attachment are known. Handle unit 206 includes handle 208, which is attached to strap section 306 via first extension 210 and second extension 212. Attachment to strap section 306 may be various attachment technologies, such as hook and loop, adhesive, rivets, buckles, etc.

While handle unit 206 has been shown in some embodiments attached to strap section 306, handle unit 206 may be attached to other structures, including end section 320, edge 110, and intermediate structures.

Handle unit 206 has been illustrated having first extension 210 and second extension 212. First extension 210 and second extension 212 have been illustrated as being separated from each other. However, first extension 210 and second extension 212 can be attached to each other, or in some cases be fully integrated with each other to form a single extension. In the case of a single extension, the single extension may be thought of as having two ends, namely a first extension and a second extension on opposite sides of the integrated member.

Figure 10:
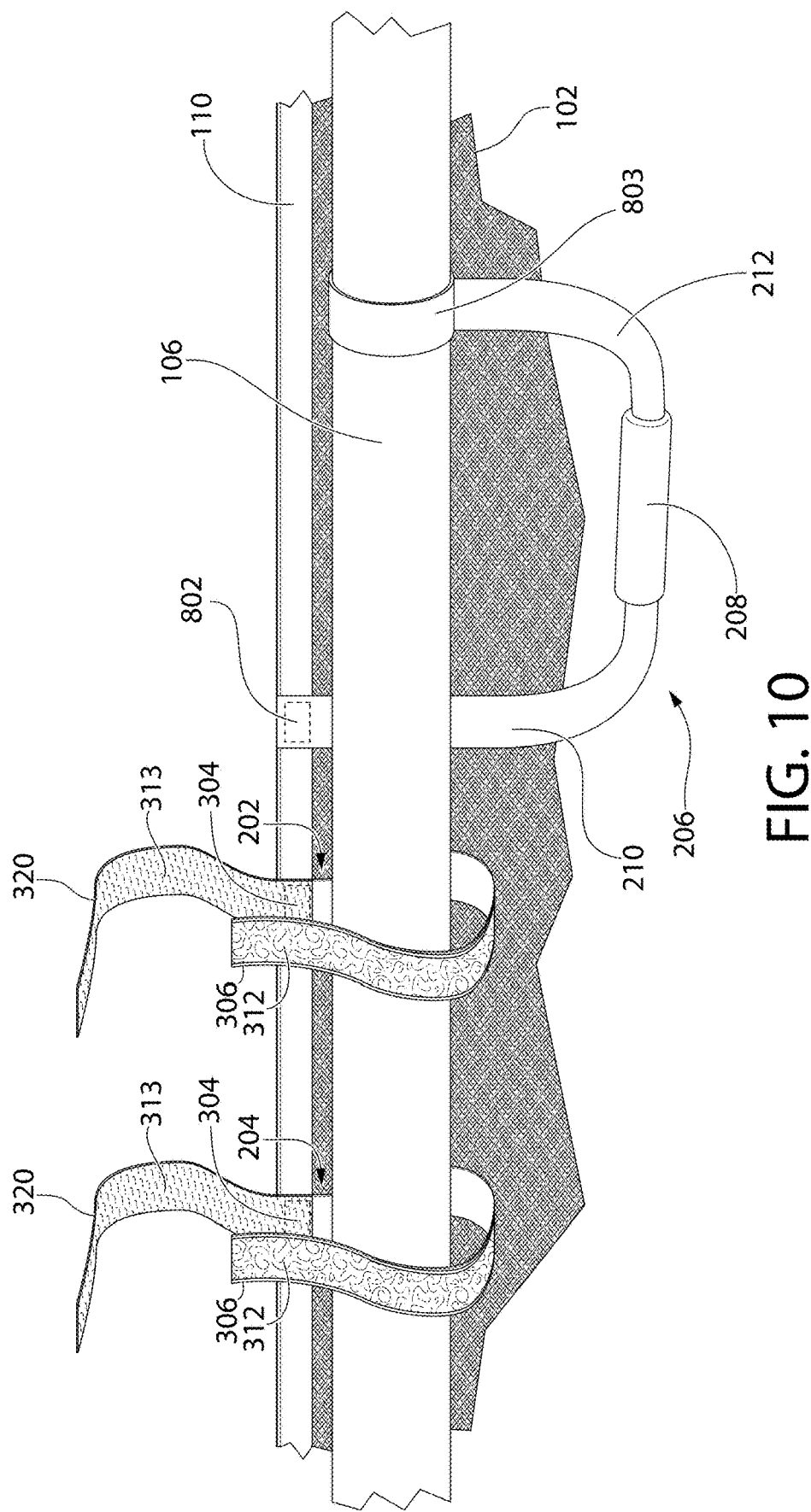
FIG. 10 is yet another perspective diagram that illustrates yet another exemplary embodiment of the present invention.

FIG. 10 is a perspective drawing that illustrates an alternative embodiment of the present invention. FIG. 10 has many similarities to FIG. 8. Again, top 102 appears in the drawing with edge 110. Straps 202, 204 are provided as in other embodiments. A grab handle is integrated with top 102, but the grab handle may or may not be separated from straps 202, 204. Straps 202, 204 are each attached to edge 110 at anchor 304. End sections 320 are included at one end of straps 202, 204 and strap section 306 is included at the other end of straps 202, 204. Strap section 306 and end section 320 include hook and loop surfaces 312, 313, respectively. The use of hook and loop technology is exemplary. Other mechanisms may be used for attaching first strap 202 and second strap 204 to a vehicle. The use of both straps 202 and 204 is optional and at least one strap may be deleted if other attachment mechanisms are in use.

Handle unit 206 is shown separated from straps 202, 204, but handle unit 206 is at least partially integrated with top 102. First extension 210 is attached to edge 110 at anchor 802. Attachment to edge 110 may be accomplished, for example, using stitches (as is disclosed in other embodiments). Other forms of attachment may also be used, such as adhesive, rivets, looping first extension 210 and second extension 212 through openings in edge 110 and then back to itself, respectively, etc.

FIG. 10 differs from FIG. 8 in that one anchor 802 is directly attached to edge 110 while another anchor 803 is attached to vehicle 100 in a different manner. In FIG. 10, for example, anchor 803 is attached to sports bar 106. Thus, while anchor 802 is coupled to top 102 by virtue of anchor 802 attached to edge 110, anchor 803 is coupled to sports bar 106.

One of the teachings of FIG. 10 is that the manner in which straps 202, 204 are coupled to vehicle 100 may not be identical. For example, extension 210 may be attached to strap 202 while extension 212 is attached to edge 110. Alternatively, extension 210 may be attached (or coupled) to strap 202 while extension 212 is attached (or coupled) to sports bar 106. When the word "coupled" is used, what is meant is that two structural components are attached directly (i.e. touching each other) or are attached indirectly (i.e. a structural component may be (but is not required to be) between the two structural components.

In one exemplary embodiment of the present invention, handle unit 206 is detachable. Handle unit may include one or more points of detachability from any attachment point associated with handle unit 206. The detachability (or in some cases, a separation) may occur between first strap 202 and handle 208. The detachability/separation may occur between second strap 204 and handle 208. The detachability/separation may occur between first strap 202 and edge 110, between second strap 204 and edge 204, between second strap 204 and sports bar 106, between the first and/or second strap 202,204 and some other point of attachment, etc. In order to provide handle unit 206 with partial or full detachability, various methods of attachment/detachment may be used including hook and loop, snaps, buckles, friction, etc.

Figure 11:
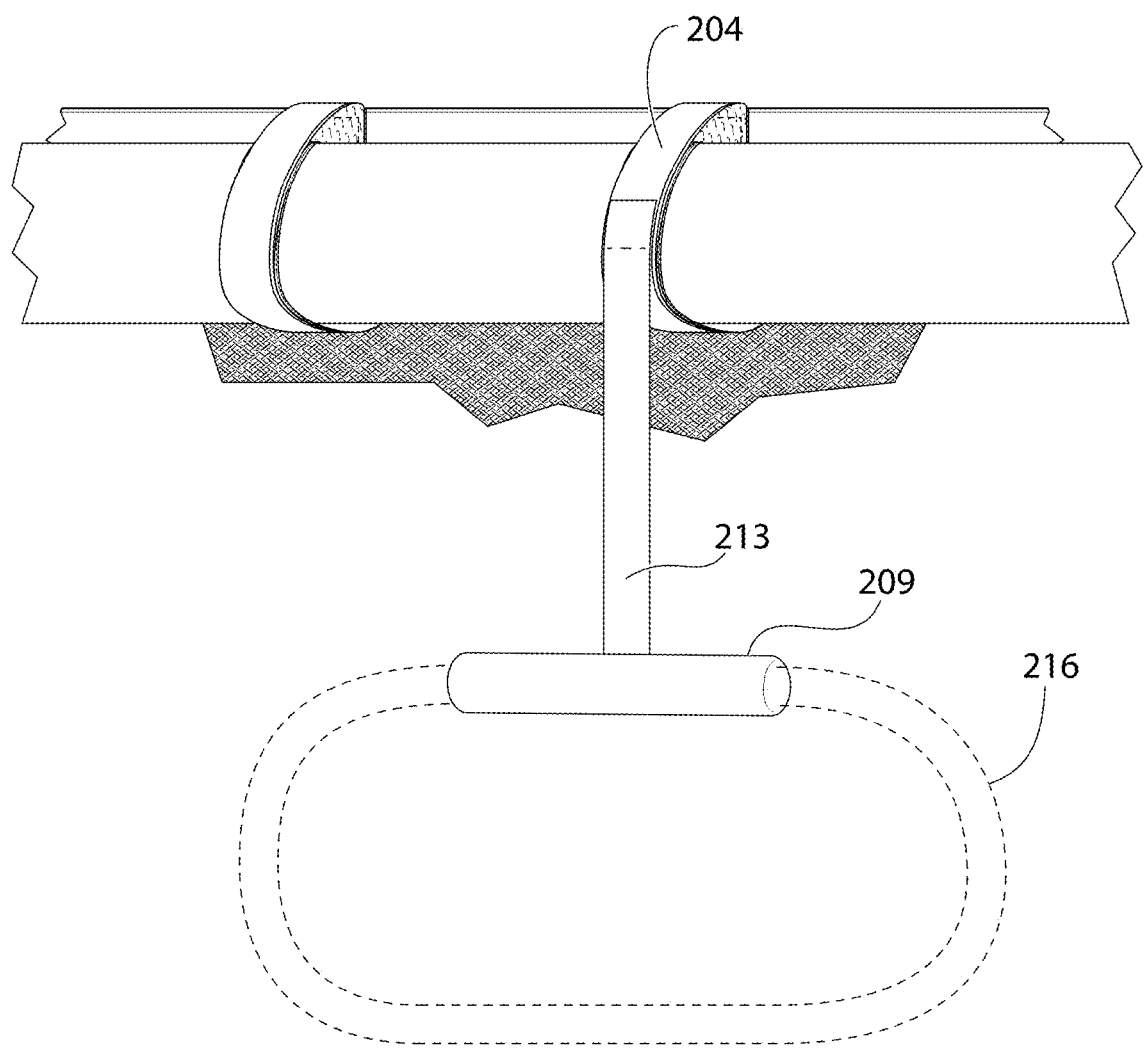
FIGS. 11-14 are perspective diagrams that illustrate further exemplary embodiments of the present invention.

FIG. 11 illustrates an alternative embodiment of the present invention in which handle 209 is provided as a grab handle. FIG. 11 illustrates that a grab handle may be included with one attachment point to top 102 if desired. Handle 209 is illustrated as including an elongated member with a front and a back. Handle 209 is attached to top 102 via extension 213. Extension 213 may be attached, for example, to strap 204 but this is exemplary. Strap 204 is attached to top 102 at edge 110 but this is exemplary. Handle 209 may be oblong, a narrow end section to extension 214, or may optionally include loop portion 216. Loop portion 216 may be circular, a partial circle, and/or includes a front portion and a back portion.

Figure 12:
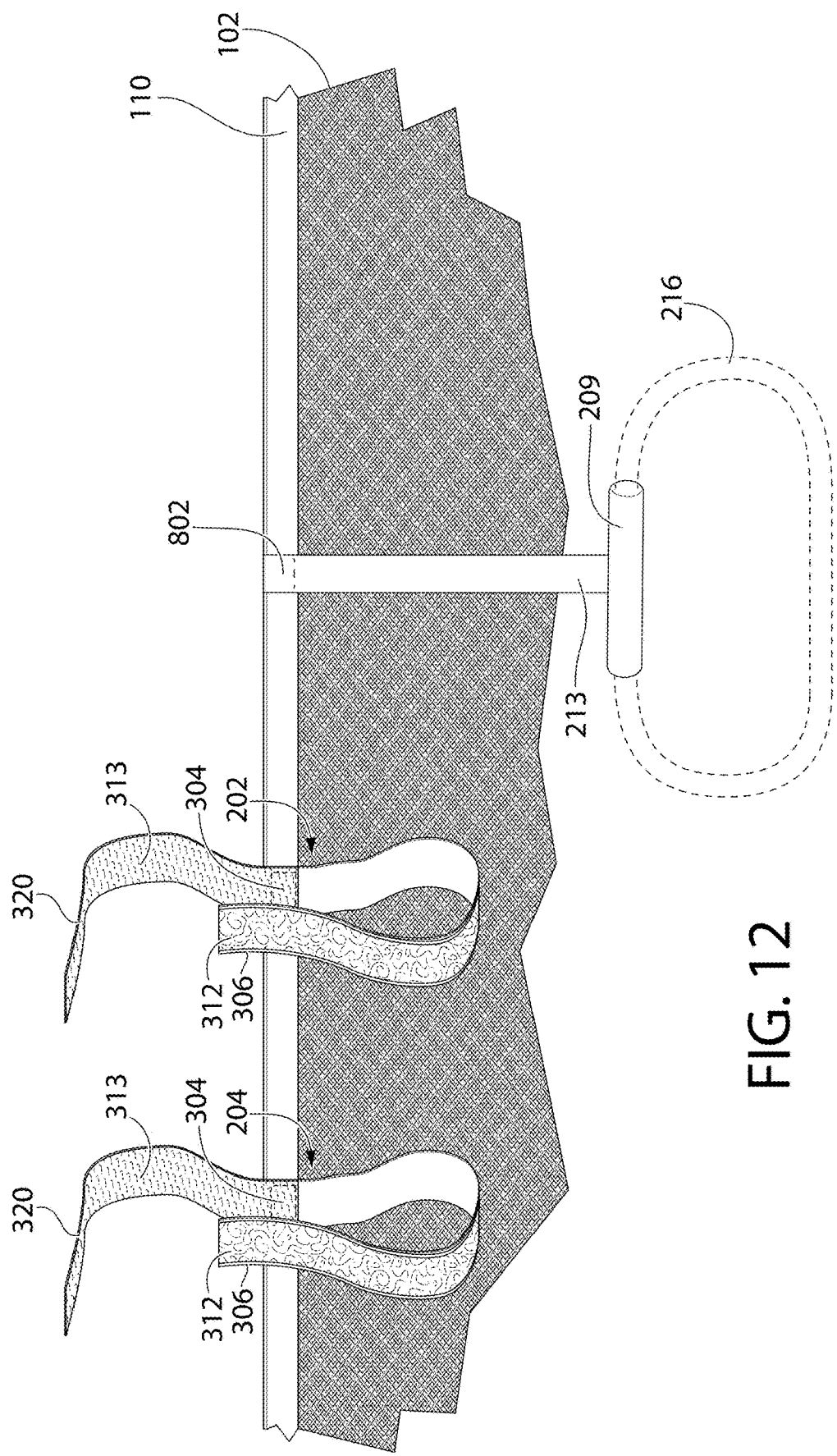

FIG. 12 illustrates an alternative embodiment of the present invention in which handle 209 is attached directly to top 102 at edge 110. Extension 213 may be attached to edge 110 via various techniques including stitching, adhesive, rivets, etc. Extension 213 may also be attached to handle 209 via various attachment techniques. Handle 209 may be elongated with a front and back, narrow so it has the width of extension 213, optionally include loop portion 216 (with a front and back), etc.

Figure 13:
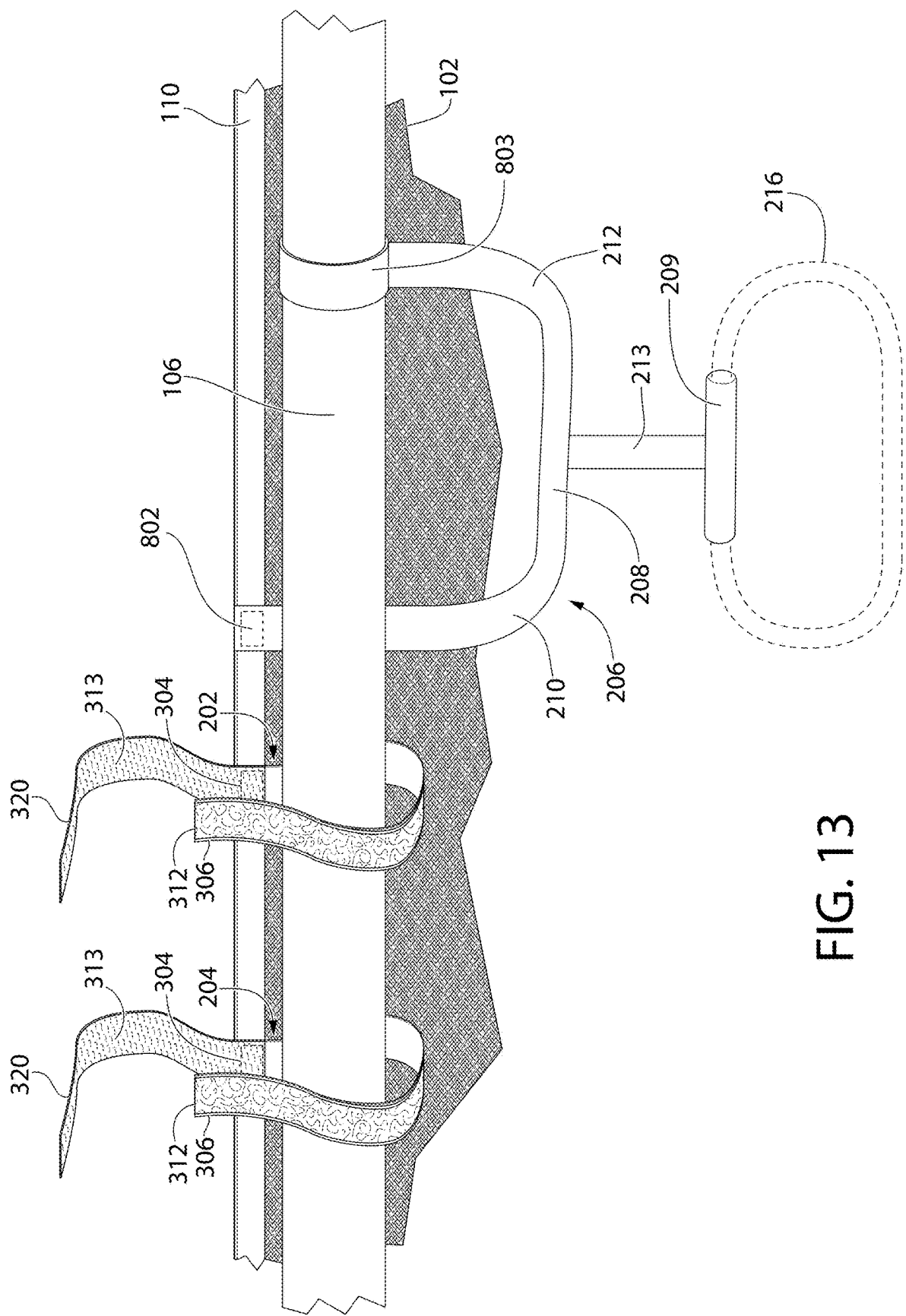

FIG. 13 illustrates an alternative embodiment of the present invention in which handle 209 is attached to top 102 via extension 213, which in turn is coupled to edge 110 via handle 208. Handle 208 may be attached to top 102 in various ways; the use of first extension 210 attached to edge 110 at anchor 802 and second extension 212 attached to sports bar 106 via anchor 803 is illustrated, but this is merely exemplary.

Figure 14:
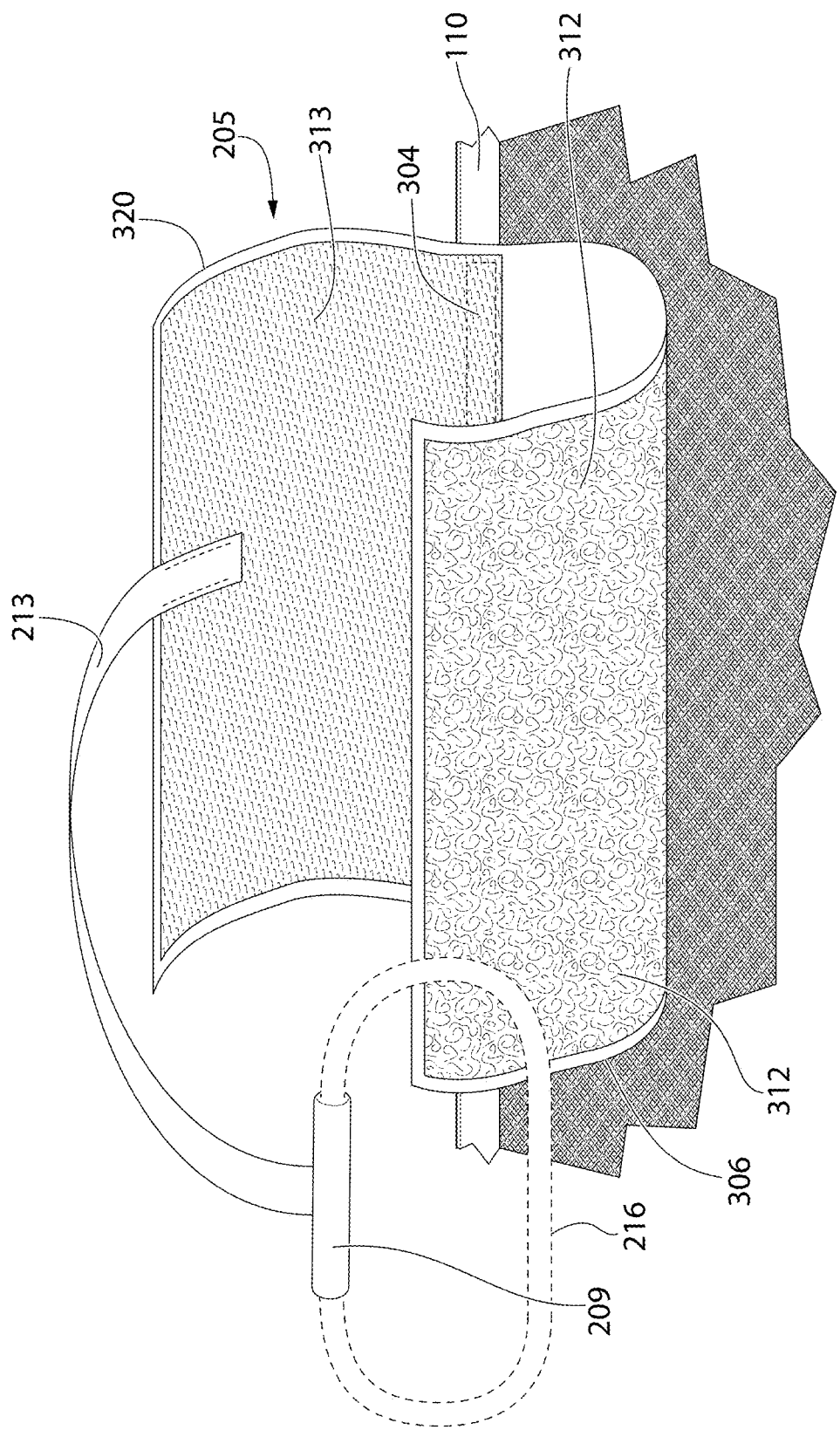

FIG. 14 illustrates an alternative embodiment of the present invention in which handle 209 is attached to top 102 via extension 213, which in turn is coupled to edge 110 via integrated strap 205. Integrated strap may have the same width as the distance between first strap 202 and second strap 204 (this is illustrated with regard to other embodiments). Integrated strap 205 may be attached to edge 110 via the attachment methods described in other embodiments (stitching, adhesive, etc.). Integrated strap may be wrapped around sports bar 106 to hold top 102 in place on top of vehicle 100.

When a handle is referred to above, a handle may be a simple strap, or something more substantial such as a plastic or metal member. The plastic or metal member may have its ends attached to further structure for attachment to top 102. The further structure may simply by attached to ends of the handle, or the further structure may be embedded in the handle. First extension 210 and second extension 212 are examples of such further structure.

While the above explanation has described straps 202, 204 (and other straps) wrapped around a sports bar, it is understood that the aforementioned straps can be attached to other structures (e.g. door rails) as well.

With the above exemplary embodiment, a soft top can be attached to a vehicle, straps may be used to attach the soft top to the vehicle, and grab handles may be integrated into the soft top. The exemplary embodiments thus provide grab handles that extend from the soft top in a manner that provides a sleek appearance.

It is understood that top 102 may include a horizontal area that spans across the top of vehicle 100. It is also understood that top 102 may include a vertical area that descends from the top of vehicle 100 and covers a portion of vehicle 100 directly behind a seating area. Top 102 may thus include a vertical member that covers the extreme rear of vehicle 100. Alternatively, top 102 may include a vertical member that descends behind the seating area of vehicle 100, but that leaves a rear area of vehicle 100 exposed to the elements.

Reference has been made above to handle 208 attached to first extension 210 and second extension 212. Alternatively, handle 208 has been described as attached to extension 213, and optionally including loop portion 216. In each embodiment, handle 208 can be characterized as including a front and back, whether first extension 210 and second extension 212 are used, whether extension 213 is used, or whether loop portion 216 is used.

It is understood that aspects of different embodiments may be combined to obtain other embodiments. The invention is not limited to the embodiments disclosed herein, but variations and combinations thereof are contemplated. While the present invention has been described herein with reference to exemplary embodiments, it should be understood that the invention is not limited thereto. Those skilled in the art with an access to the teachings herein will recognize additional modifications, applications, and embodiments within the scope thereof and additional fields in which the invention would be useful.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

PARTS LIST

50 Hardtop
62 Hood
100 Vehicle
102 Top
104 Straps
106 Sports Bar
108 Sports Bar
110 Edge
112 Edge
200 Attachment Assembly
202 First Strap
204 Second Strap
205 Integrated Strap
206 Handle Unit
208 Handle
209 Handle
210 First Extension
212 Second Extension
213 Extension
214 Hardtop
216 Loop portion
220 Door
300 Top Edge
302 Loop
304 Anchor
305 Anchor
306 Strap Section
308 Stitching
310 Stitching
312 Hook and Loop Surface (e.g. Velcro)
313 Hook and Loop Surface (e.g. Velcro)
314 Buckle
316 Inner Layer
318 Outer Layer
320 End Section
322 Stitching
324 Stitching
400 Loop
802 Anchor
803 Anchor

The invention claimed is:

1. Apparatus for covering at least a portion of a vehicle, said apparatus comprising:
a flexible top;
a first extension member extending from said flexible top, said first extension member adapted for attaching said flexible top to said vehicle;
a second extension member extending from said flexible top, said second extension member adapted for attaching said flexible top to said vehicle;
a handle having a front and a back, said handle attached to said flexible top via said first extension member, said handle adapted to extend downwards from said top, with said first extension member between said top and said handle, when said top is at least partially covering said vehicle.

2. Apparatus according to claim 1, said first extension member includes a buckle and a first strap, said first strap extends through said buckle and then said first strap attaches to itself.

3. Apparatus according to claim 1, said first extension member includes a first strap that is comprised of multiple layers that are attached to each other, said handle includes a first end that is attached to said first strap between said multiple layers.

4. Apparatus according to claim 3, said first extension member includes and buckle and a first strap, wherein said multiple layers form a loop that extends through said buckle.

5. Apparatus according to claim 1, wherein said first extension member includes a first strap that forms a loop that is adapted to surround a portion of said vehicle.

6. Apparatus according to claim 5, wherein said portion of said vehicle is a bar that extends between a front and a rear of said vehicle.

7. Apparatus according to claim 1, wherein said first extension member includes a first strap that is attached to said vehicle by said first strap attaching to itself.

8. Apparatus according to claim 7, wherein said first strap attaches to itself via a hook and loop attachment surface.

9. Apparatus according to claim 1, wherein said handle attaches to said flexible top at two locations.

10. Apparatus according to claim 1, wherein said first strap includes a first end and a second end that are adapted to attach to each other and form a loop around a portion of said vehicle.

11. Apparatus according to claim 1, wherein the handle includes a first handle end that is attached directly to the flexible top.

12. Apparatus according to claim 1, wherein the handle includes a first handle end that is attached to said top via said first extension member.

13. Apparatus according to claim 1, wherein said vehicle includes a sport bar above a passenger compartment of said vehicle, and said handle includes a second handle end that is attached to said sport bar.

14. Apparatus according to claim 1, wherein said handle is capable of being detached from being coupled to said flexible top or said vehicle.

15. A method of covering at least a portion of a vehicle, said method comprising the steps of:
   providing a flexible top, said flexible top including a top member and a first extension member extending from said top member,
   attaching said first extension member to said vehicle;
   a second extension member extending from said top member,
   attaching said second extension member to said vehicle;
   wherein a handle having a front and a back is attached to said top member via said first extension member, said handle adapted to extend downwards from said top member, with said first extension member between said top member and said handle, when said top member is at least partially covering said vehicle.

* * * * *